United States Patent [19]
Sausner et al.

[11] Patent Number: 5,467,961
[45] Date of Patent: Nov. 21, 1995

[54] ELECTROMAGNETICALLY ACTUATED VALVE

[75] Inventors: Andreas Sausner, Neu Isenburg; Stefan Knapp, Waldmichelbach, both of Germany

[73] Assignee: Firma Carl Freudenberg, Weinheim, Germany

[21] Appl. No.: 239,082

[22] Filed: May 6, 1994

Related U.S. Application Data

[63] Continuation-in-part of Ser. No. 215,218, Mar. 21, 1994.

[30] Foreign Application Priority Data

May 6, 1993 [DE] Germany .................. 43 15 013.6

[51] Int. Cl.⁶ .................................................. F16K 31/06
[52] U.S. Cl. .................. 251/129.15; 335/257; 335/261
[58] Field of Search .................... 251/129.01, 129.15, 251/129.16, 129.18, 62; 335/255, 257, 261, 248, 251

[56] References Cited

U.S. PATENT DOCUMENTS

| | | | |
|---|---|---|---|
| 2,353,835 | 7/1944 | Lane et al. | 335/261 X |
| 3,171,439 | 3/1965 | Lansky et al. | 251/62 X |
| 4,846,810 | 7/1989 | Gerber | 137/853 |
| 5,246,199 | 9/1993 | Numoto et al. | 251/129.15 |

*Primary Examiner*—Martin P. Schwadron
*Assistant Examiner*—Kevin L. Lee
*Attorney, Agent, or Firm*—Kenyon & Kenyon

[57] ABSTRACT

An electromagnetically actuated valve comprising an annular-shaped solenoid coil arranged in a housing and surrounding an axially reciprocal magnet armature of metallic material is disclosed. The magnet armature is provided on a front end with an elastomeric sealing member facing a valve seat made of elastomeric material. The magnet armature and the sealing member are joined together via form locking.

9 Claims, 3 Drawing Sheets

ELECTROMAGNETICALLY ACTUATED VALVE

RELATED APPLICATION

This application is a continuation-in-part of U.S. patent application Ser. No. 08/215,218 entitled "Electromagnetically Actuated Valve" filed on Mar. 21, 1994 by Sebastian Zabeck and Andreas Sausner, the contents of which are incorporated herein by reference.

BACKGROUND OF THE INVENTION

The invention relates generally to an electromagnetically actuated valve comprising an annularly-shaped solenoid coil, which is arranged in a housing and surrounds a magnet armature of metallic material that is capable of axially reciprocal motion with respect to the solenoid coil. The magnet armature is provided on the front end facing the valve seat with a sealing member made of an elastomeric material.

Such a valve is disclosed by German Patent Application P 43 09 739.1 (corresponding to U.S. patent application Ser. No. 08/215,218). In that Application, the magnet armature consists of a metal part and an elastomeric material that is extruded onto it and which forms the sealing member. The provision of a secure connection between the elastomer and the metallic material of the armature is important in determining the opening characteristics of the valve. During normal operational use of the valve, it is important to ensure that no separation occurs in the area of that connection, lest the goal of consistent opening characteristics across a long service life be compromised. For that reason, in the aforementioned device, an adhesive agent is applied between the elastomeric and the metallic material, which guarantees a reliable coupling between the two parts.

SUMMARY OF THE INVENTION

The present invention provides a secure connection between the elastomeric material and the metal of the armature without requiring the use of adhesive.

Instead of using adhesives, the magnet armature and the sealing member are joined together via form locking. The sealing member is advantageously prevented from executing an axial relative movement with respect to the armature, as the elastomer is prevented from separating from the metallic material of the magnet armature. Because the two parts are coupled to one another with form-locking, an adhesive agent is no longer needed to join the two parts, thus permitting the more economical production of the valve. Furthermore, in dispensing with the adhesive or binding agent, one is also able! to dispense with the process step required for applying such an agent.

According to one advantageous refinement, the side of the magnet armature facing the valve seat can have a grooved undercut extending along its peripheral surface, the undercut and the sealing member being in engagement with one another. In this manner, the secure and reliable fixation of the sealing member to the armature can be established over the entire service life. The undercut is located directly axially adjacent to the contact surface between the sealing member and the valve seat, thus ensuring that the sealing member is exactly and permanently fixed in position relative to the magnet armature and that changes in cross-section of the valve resulting from an axial displacement of the sealing member in relation to the valve are prevented. The sealing member and/or the undercut can be provided as two parts capable of being snapped into one another.

The magnetic core can be penetrated by a through-bore which extends in the axial direction of armature motion and which is completely filled by the elastomeric material of the sealing member, the elastomeric material forming a stop buffer on the front end of the magnet armature facing away from the sealing member. The stop buffer has a cushioning effect when the magnet armature moves in the open position of the valve and, as a result, prevents impact noises. The elastomeric material of the sealing member and the stop buffer can be injected in a one-step operation, on one side, into the through-bore.

In the area of the through-bore, the magnet armature form lockingly engages the elastomeric material. In this manner, the elastomeric material can be prevented from being displaced relative to the metallic material of the magnet armature, which prevents the two parts from becoming separated from one another. It should be stressed that this facilities the economical manufacture of the magnet armature, as neither an adhesive agent nor binding agent, nor the step for their application, is required. Since the elastomeric material is securely affixed to the metallic material of the armature, uniformly good performance characteristics are achieved for the valve over a long service life.

In the area of the through-bore, the magnet armature can be provided with cavities having a depth of 0.5 to 3.0 mm. The cavities inside the metallic material of the magnet armature produce a mechanical claw-like fixation effect with respect to the elastomeric material that the through-bore is penetrated with. The cavities can be produced in the armature in a number of ways, e.g., they can be machine-cut on a lathe.

In the area of the through-bore, the magnet armature can have an internal screw thread. Cavities designed in this manner can be simply produced. The elastomeric material is injected into the through-bore, where it completely fills in the cavities and is connected to them via form-locking.

According to another refinement, the through-bore can be conically widened in its cross-section, starting from the front end of the sealing member. According to one advantageous refinement, the upper surface delimiting the through-bore forms an angle of 2° and 45°, and preferably between of 5° and 30° with respect to the axis of the magnet armature. When such a conical, cross-sectional widening is provided in conjunction with a grooved undercut in the magnet armature proximal the sealing member, the connection between the sealing member and the metallic material of the magnet armature is still further enhanced. Also, any partial vacuum that may occur in the area of the valve seat will not cause the elastomeric material to separate from the metallic material.

In another embodiment, the through-bore has a cross-section that is reduced by steps in the direction of the sealing member. The transition between adjacent stepped areas can be conical or rounded, so as to minimize notch effects in the elastomeric material and completely fill up the through-bore. As with the other embodiments, form-locking between the elastomeric material and the metallic material of the magnet armature is utilized to enhance the connection between the two.

The elastomeric material of the sealing member can have a Shore hardness A of 40 to 100. In this case, it is advantageous that the material be chosen so as to exhibit only a slight degree of relaxation over its entire service life and consequently, be secured relatively immovably to the metallic material of the magnet armature. The material chosen should also provide a good sealing effect when the valve is in the closed position.

BRIEF DESCRIPTION OF THE FIGURES

Three embodiments of an electromagnetically actuated valve constructed according to the principles of the invention are depicted in the drawings and described and set forth in greater detail below.

DETAILED DESCRIPTION

Figure 1:
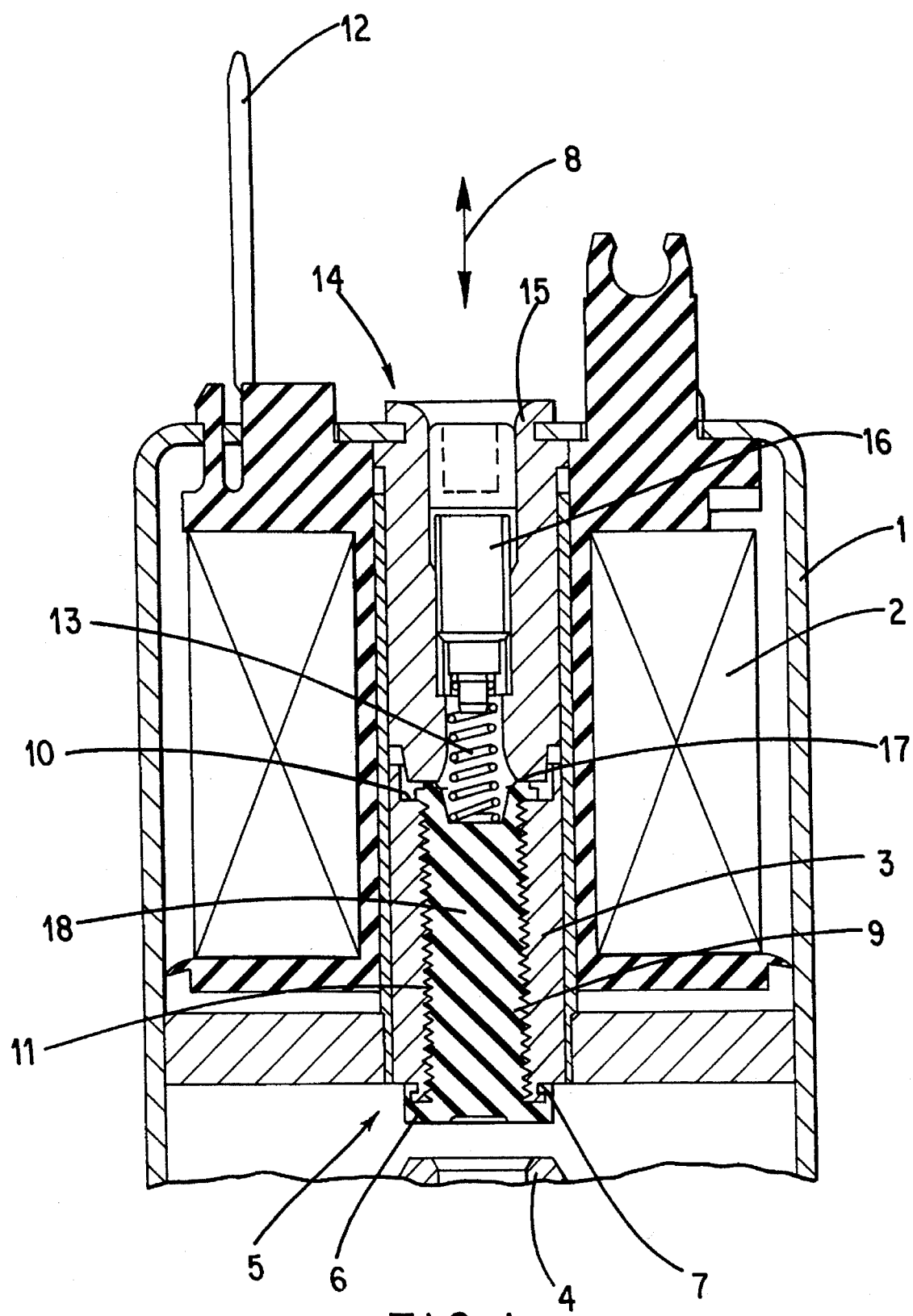
FIG. 1 is a cross-sectioned view of a first embodiment of an electromagnetically actuated valve, in which the through-bore of the magnet armature is delimited by an internal screw thread.
Figure 2:
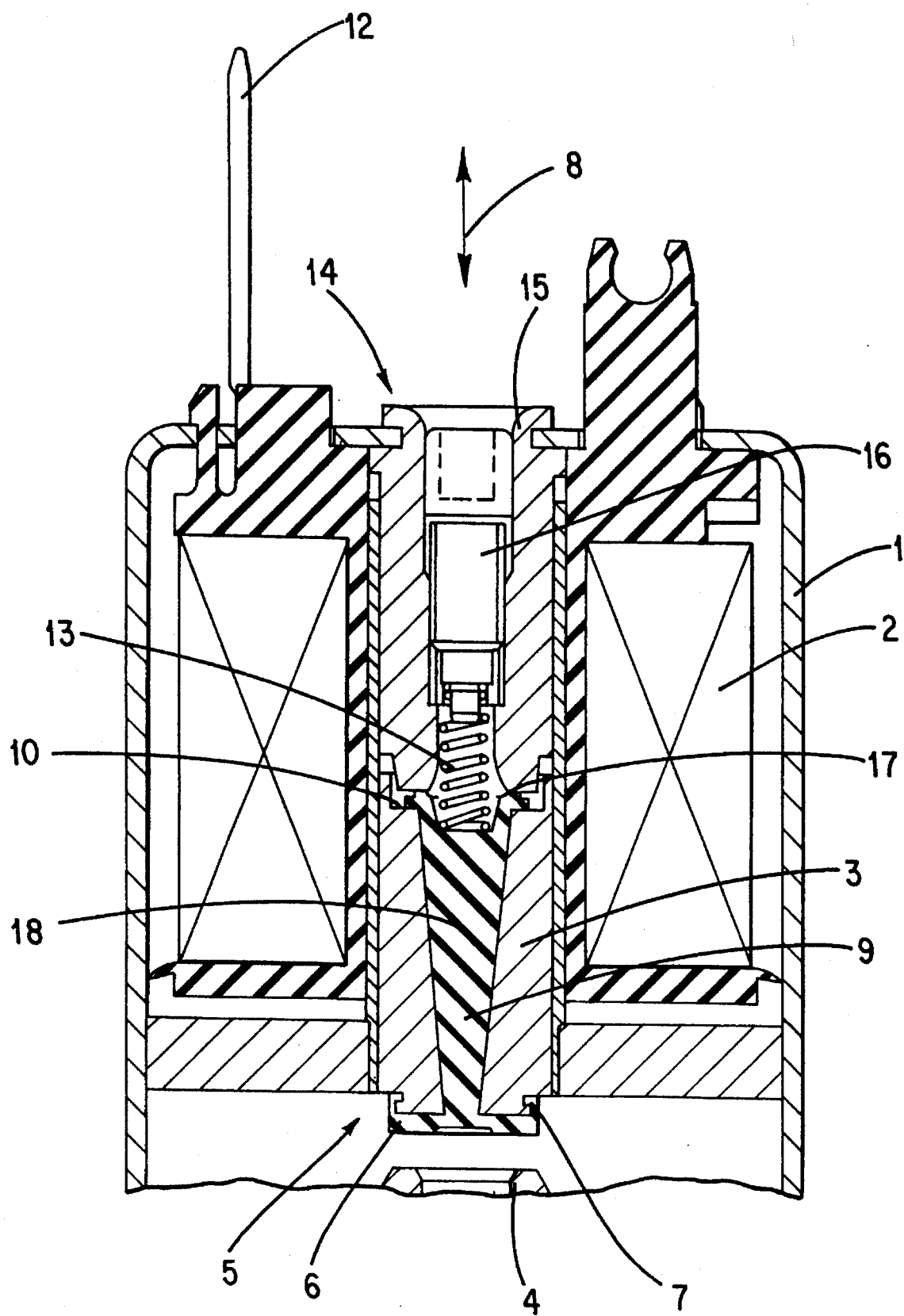
FIG. 2 is a view similar to FIG. 1 an illustrating a second embodiment in which the through-bore has a conical design.
Figure 3:
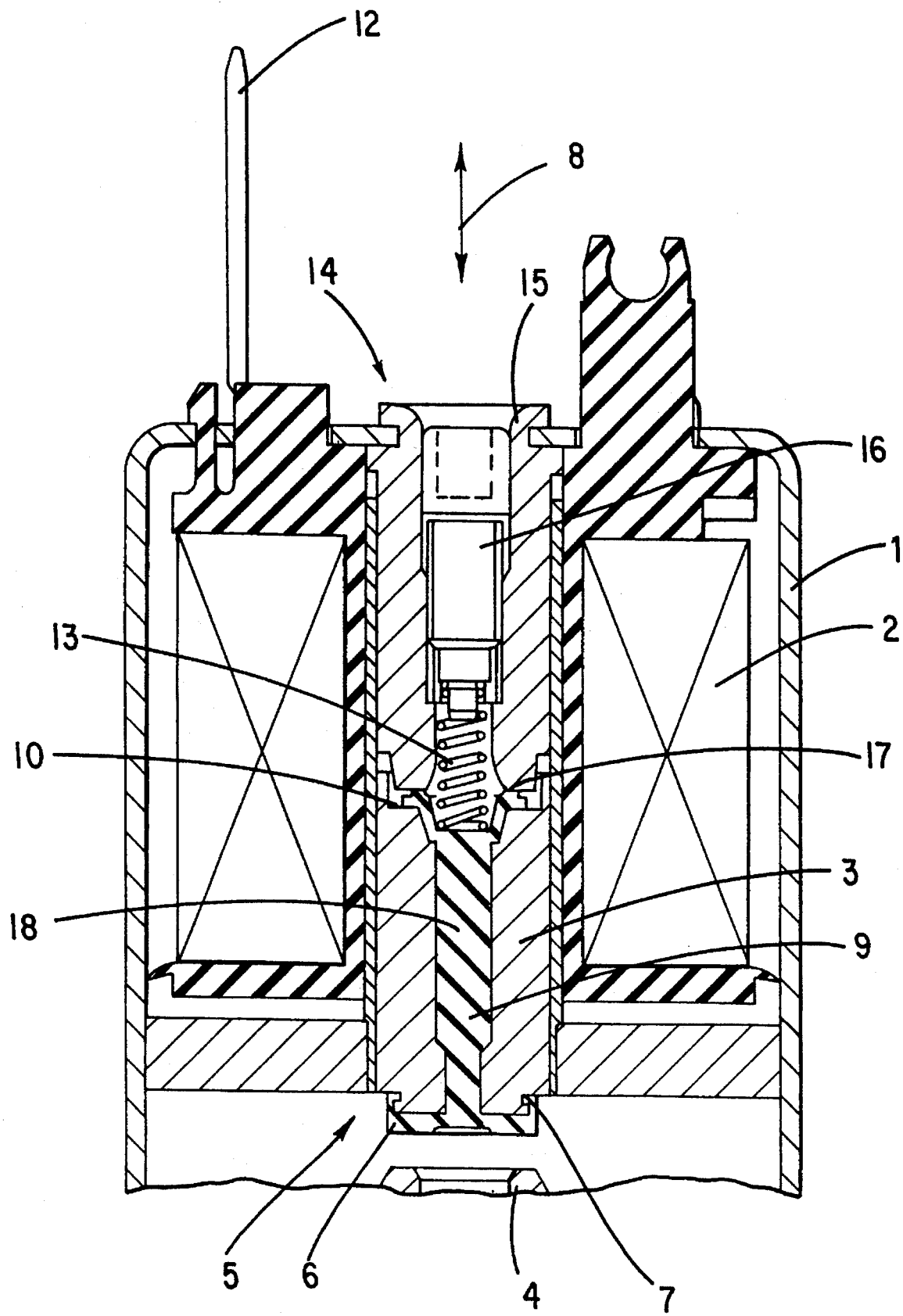
FIG. 3 shows a third embodiment, in which the through-bore of the magnet armature has a cross-section that varies step-by-step.

FIGS. 1, 2 and 3 each show a cut-away portion of an electromagnetically actuated valve in which a valve and actuator are surrounded by a housing 1. The valve comprises an annularly-shaped solenoid coil 2 having an electrical terminal connection 12. The solenoid coil 2 surrounds the periphery of a magnet armature 3, which is capable of axially reciprocal motion with respect thereto parallel to the axis of symmetry 18. The armature 3 is braced in the area of its front end 10, which faces away from a sealing member 6, by a helical compression spring 13 whose compressive load is transmitted against an abutment 14. On its opposite side, the magnet armature 3 is provided with a sealing member 6, which can be shifted into sealing engagement with the valve seat 4, as needed. In this embodiment, the abutment 14 has a two-part design and consists of a holding device 15, which is permanently connected to the housing 1, and a threaded member 16, which is designed to serve as an adjusting element. In the embodiments shown here, the helical compression spring 13 is guided on the outside in the area of the front end 10 facing away from the sealing member 6 by a receiving seat in the armature. The cavity of the magnet armature 3 on the side facing the helical compression spring 13 is provided with elastomeric material, which fills up a series of cavities or bore 9 within the armature. In the direction of the holding device 15, the elastomeric material is provided with stop buffers 17, which are premolded in one piece and are provided to act as a cushion. In all three embodiments, the through-bore 9 of the magnet armature 3 is completely filled up with elastomeric material.

FIG. 1 depicts a first embodiment of the magnet armature 3, in which the inner wall of the metallic material delimiting the through-bore 9 on the interior of the armature is provided with an internal screw thread 11. The screw thread can have a single- or a multi-thread design having a depth of 0.5 mm to 3.0 mm, the depth of the screw-thread undercuts in the illustrated embodiment being 2.5 mm. On the side facing the valve seat 4, the magnet armature 3 is provided with a sealing member 6, which is snapped into an undercut 7. In this manner, the elastomeric material, with which the through-bore 9 is filled and of which the sealing member 6 is made, is retained relatively immovably in the moving direction 8 inside the magnet armature 3.

FIG. 2 depicts a second embodiment of the magnet armature 3, which differs from the one described previously in the form of its through-bore 9. Starting from the sealing member 6, which is likewise snapped into an undercut 7, the through-bore 9 is provided with a conical cross-section that widens continuously in the direction of the helical compression spring 13. The angle formed by the upper surface of the through-bore 9 with the axis of the magnet armature 3 is, in this embodiment, 5°. If the preload forces of the helical compression spring 13 are greater than in the exemplified embodiment shown here, the angle can be greater than 5°.

FIG. 3 illustrates a third exemplary embodiment of the magnet armature 3, in which the cross-section of the through-bore 9 is reduced by steps in the direction of the sealing member 6, starting from the helical compression spring 13. In this embodiment, the area of the cross-sectional narrowing has a conical design to minimize notch effects in the elastomeric material. The sealing member 6 is secured in the undercut 7, in the same manner as in FIGS. 1 and 2.

In the exemplary embodiments shown in FIG. 1 through 3, the magnet armature 3 and the sealing member 5 are coupled together via form-locking, in the same way as the elastomeric material located within the through-bore 9. This improvement makes it unnecessary to adhesively rubber to metal, which affords significant savings in terms of production engineering and economy.

We claim:

1. An electromagnetically actuated valve, comprising:
   a valve housing;
   a metallic magnet armature having a first end and a second end and an axially extending through-bore penetrating therethrough, the through bore being completely filled by an elastomeric material which extend through the first end to provide a stop buffer on the first end of the magnet armature and through the second end to provide an elastomeric sealing member on the second end of the magnet armature that is form-lockingly joined to the magnet armature via a grooved undercut that extends on the periphery of the magnet armature, said undercut and said sealing member being in engagement with one another;
   at least one annularly-shaped solenoid coil that is arranged within the valve housing and which, along a portion of its interior annulus, surrounds the magnet armature, said magnet armature being capable of axially reciprocal motion with respect to the solenoid coil; and
   a valve seat, against which the sealing member of the magnet armature may selectively be brought into operative engagement.

2. The electromagnetically actuated valve according to claim 1, wherein the magnet armature is provided with cavities having a depth of 0.5 mm to 3.0 mm.

3. The electromagnetically actuated valve according to claim 1, wherein the magnet armature is provided with cavities having a depth of 0.5 mm to 3.0 mm.

4. The electromagnetically actuated valve according to claim 1, wherein in the area of the through-bore the magnet armature has an internal screw thread.

5. The electromagnetically actuated valve according to claim 1, wherein the cross section of the through-bore is step-wise reduced in area in the direction of the sealing member.

6. The electromagnetically actuated valve according to claim 1, wherein the elastomeric material of the sealing member has a Shore hardness A of 40 to 100.

7. An electromagnetically actuated valve, comprising:

a valve housing;

a metallic magnet armature having a first end and a second end, the second end having an elastomeric sealing member that is form-lockingly joined to the magnet armature, wherein the magnet armature is penetrated by an axially extending through-bore that conically widens from the second end to the first end, said through-bore being completely filled by the elastomeric material of the sealing member, and wherein the elastomeric material forms a stop buffer on the first end of said magnet armature;

at least one annularly-shaped solenoid coil that is arranged within the valve housing and which, along a portion of its interior annulus, surrounds the magnet armature, said magnet armature being capable of axially reciprocal motion with respect to the solenoid coil; and a valve seat, against which the sealing member of the magnet armature may selectively be brought into operative engagement.

8. The electromagnetically actuated valve according to claim 7, wherein the through-bore conically widens at an angle of between 2 and 45 degrees with respect to the central longitudinal axis of the through-bore.

9. The electromagnetically actuated valve according to claim 7, wherein the through-bore conically widens at an angle of between 5 and 30 degrees with respect to the central longitudinal axis of the through-bore.

* * * * *